E. P. ALLEN.
QUICK ACTING RADIATOR VALVE.
APPLICATION FILED JULY 3, 1905.
933,222.
Patented Sept. 7, 1909.
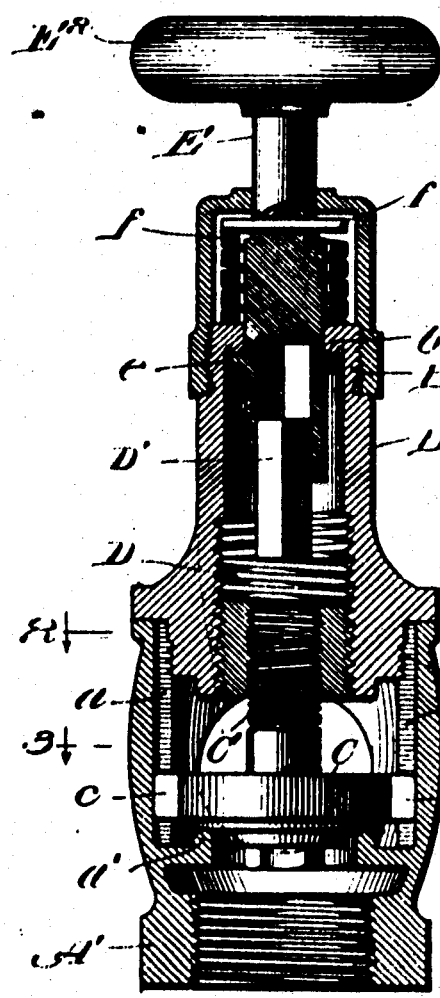
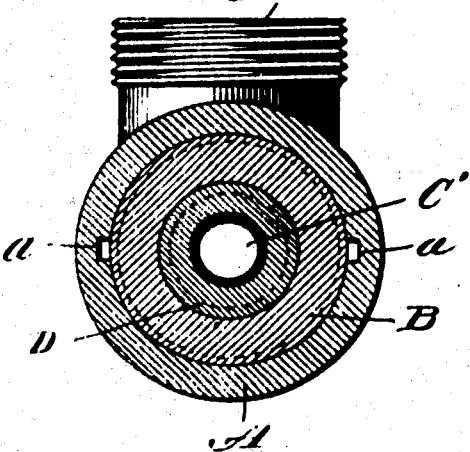
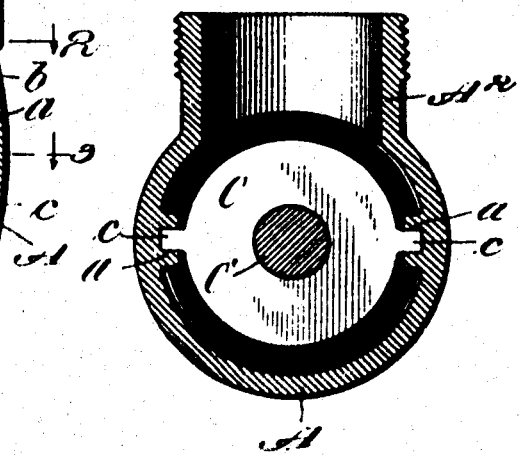
Witnesses:
Harry L. Gaither
Ruby V. Nash
Inventor:
Everett P. Allen
by his Attorneys

UNITED STATES PATENT OFFICE.

EVERETT P. ALLEN, OF CHICAGO, ILLINOIS, ASSIGNOR TO NORWALL MANUFACTURING COMPANY, OF CHICAGO, ILLINOIS.

QUICK-ACTING RADIATOR-VALVE.

933,229.　　　　Specification of Letters Patent.　　Patented Sept. 7, 1909.

Application filed July 3, 1905. Serial No. 268,064.

*To all whom it may concern:*

Be it known that I, EVERETT P. ALLEN, a citizen of the United States, residing at Chicago, county of Cook, State of Illinois, have invented a certain new and useful Improvement in Quick-Acting Radiator-Valves, and declare the following to be a full, clear, and exact description of the same, such as will enable others skilled in the art to which it pertains to make and use the same, reference being had to the accompanying drawings, which form a part of this specification.

My invention relates in general to valves for controlling the flow of fluid through a conduit, and more particularly to valves used in heating systems intermediate of the radiators and pipes for supplying the heating medium.

It is customary in steam and hot water heating systems to provide hand-operated valves for controlling the flow of the heating medium to the radiator. Much difficulty is experienced in preventing leakage of the heating medium from the valve casings into which the valve operating stems extend. It is usual to provide packing of some sort around the valve stems which is, however, objectionable owing to the fact that the materials best adapted for producing a tight joint deteriorate from contact with the steam and packings formed of other materials become loose with usage. The leakage is increased by the wear imposed upon the packing by the rotation of the valve stem relatively to the casing in opening and closing the valve.

The primary object of my invention is to provide a valve for controlling the flow of a fluid through a conduit the relatively rotating parts of which will at all times prevent leakage of the fluid through the valve casing.

A further object of my invention is to provide a valve which will be simple in construction, inexpensive in manufacture, and be fluid tight.

The embodiment of my invention herein disclosed may be generally described as consisting of a valve casing, a valve seat in the casing, a valve coöperating with the seat, a rotary valve stem extending within the casing, means for operatively connecting the stem with the valve to open and close the latter, an annular flange carried by the stem and projecting around the same, a circular seat at the upper end of the casing, under which the flange on the stem extends, and means for retaining the flange in close contact with the seat to prevent leakage between the stem and the casing.

My invention will be more fully described hereinafter with reference to the accompanying drawing in which the same is illustrated as embodied in a convenient and practical form, and in which—

Figure 1 is a central sectional view; Fig. 2 a horizontal view on line 2—2 Fig. 1; and Fig. 3 a sectional view on line 3—3 Fig. 1.

Similar reference characters are used to designate similar parts in the several figures of the drawing.

Reference letter A designates the valve casing which is adapted to be interposed between a conduit for a heating medium and a radiator.

$A'$ indicates an interiorly screw-threaded coupling formed integrally with the valve casing which is adapted to be united to the conduit through which the heating medium flows.

$A^2$ indicates an exteriorly screw-threaded coupling formed integrally with the valve casing and adapted to be connected to a radiator.

B designates a bonnet in the form of a tubular extension of the valve casing provided with an exteriorly screw-threaded lower end which is received within the upper portion of the valve casing. A circular seat $b^2$, preferably convex in cross section is formed at the upper end of the tubular extension B of the valve casing. A valve stem E extends within the upper portion of the valve casing and is provided with an annular laterally projecting flange $e$ which underlies and engages the seat $b^2$.

F designates a cap which surrounds the valve stem E and is in screw threaded engagement with the upper end of the tubular extension B of the valve casing. A spring $f$ surrounds the portion of the valve stem within the cap F and is interposed between the upper end of the extension B of the valve casing and a pin $f'$ or other projection fixed to the valve stem. In the particular arrangement shown the upper member of the valve stem is placed in position by inserting it through the opening in the top wall of the bonnet from within the bonnet; consequently the member f' should, in this case, be detachable and may conveniently consist of a pin driven through an opening in the stem. The tension of the spring retains the flange on the stem in close contact with the overlying circular seat b at the upper end of the valve casing.

E² indicates a disk or other form of handle rigidly fixed to the upper end of the valve stem E for rotating the latter.

C designates a valve within the casing A which is adapted to engage a valve seat a' preferably convex in cross-section, to cut off the flow of the heating medium or other fluid through the valve casing and is adapted to be moved away from its seat to permit the flow of the heating medium or other fluid through the casing. In order that the valve may be prevented from rotating relatively to the casing, it is provided with radially projecting ribs c, c, which engage within vertical grooves a, a formed in the casing. The valve is provided with a shank C' having a right exterior screw thread thereon.

Interposed between the valve stem E and the valve shank C' is a member D comprising an interiorly screw-threaded socket into which extends the screw threaded shank of the valve. The exterior of the member D is provided with a left screw thread which engages a corresponding screw thread formed within the extension B of the valve casing. The upper portion D' of the member D is rectangular in cross-section and projects within a socket of similar cross-section carried by the valve stem E.

The operation of my invention is as follows: When it is desired to unseat the valve the hand disk E² is rotated toward the left, such rotary motion being transmitted to the member D. The rotation of the member D relatively to the casing causes such member to move upwardly while at the same time the rotation of such member relatively to the valve shank C' draws the latter upwardly within the socket in the member D. It will be observed that by reason of the reversed screw threads, the valve is moved away from the seat a' both by the upward movement of the member D relatively to the casing and by the upward movement of the valve shank relatively to the member D. A comparatively slight rotary motion imparted to the valve stem consequently results in the valve being quickly moved away from its seat.

In order to close the valve the hand disk E² is rotated toward the right which effects the quick closing of the valve by reason of the downward movement of the member D within the casing and the coincident downward movement of the valve shank within the socket of the member D.

The convex cross-section of the valve seat a' insures a tight engagement of the valve therewith while the convex seat b² against which the annular flange e on the valve stem is forced prevents leakage of the fluid between the valve stem and casing.

From the foregoing description it will be observed that I have invented an improved valve adapted for use as a basin cock, faucet, gate, or globe valve which will at all times be proof against leakage owing to the constant tight engagement between the flange on the valve stem and overlying seat on the valve casing.

Having now fully described my invention, what I claim is new, and desire to secure by Letters Patent is:

1. The combination with a valve casing, of a valve within said casing, a screw-threaded stem on said valve, a nut on said stem having screw-threads which engage with corresponding screw-threads in said casing, means for preventing rotation of the valve, a second stem projecting beyond the casing, an operating member on the outer end of said second stem, there being between said second stem and said nut a connection for permitting relative axial movement and preventing relative rotary movement, a flange on said second stem, a bearing seat on said casing, and a spring for holding said flange against said seat.

2. The combination with a valve casing, of a valve within said casing, a bonnet projecting from said casing and having an inwardly facing seat at a point near its outer end, a valve stem projecting through said bonnet and operatively connected to said valve, said stem having a yielding connection at a point within the bonnet, an annular flange on said stem arranged beneath said seat, a spring engaging the outer end of said bonnet, and a shoulder on said stem in engagement with said spring whereby the flange is held against said seat.

3. The combination with a valve casing, of a valve within said casing, a bonnet projecting from said casing and having an inwardly facing seat at a point near its outer end, a valve stem projecting through said bonnet and operatively connected to said valve, said stem having a yielding connection therein at a point within the bonnet, an annular flange on said stem arranged beneath said seat, a spring engaging the outer end of said bonnet, a shoulder on said stem in engagement with said spring whereby the flange is held against said seat, and a cap screw-threaded upon the outer end of said bonnet and inclosing said spring.

4. A valve comprising a casing, a rotatable valve stem mounted therein, a seat engaging part movably connected with said stem, two parts one on the casing, and one on the stem and underlying that on the casing, a spring for forcing said two latter parts toward each other and means detachably mounted on the stem in engagement with the outer end of the spring for maintaining the spring under compression, said means contained wholly within the casing so as to be inaccessible when the parts are in position.

5. A valve comprising a casing, a rotatable valve stem mounted therein, a seat engaging part movably connected with the valve stem, two parts one on the stem and the other attached to the casing, a spring for forcing said two parts toward each other, and means detachably mounted on the stem for maintaining said spring under compression independent of said seat engaging part, said means contained wholly within the casing so as to be inaccessible when the parts are in position.

6. A valve comprising a casing, a rotatable member mounted therein, a seat-engaging part movably connected with said stem, two engaging parts one on the casing and one on the stem and underlying that on the casing, a spring surrounding said stem within the casing at such a point as to bring the said engaging part on the casing between the spring and the coöperating engaging part on the stem, a shoulder on the casing for engaging with the inner end of the spring, and a detachable member carried by the stem in engagement with the outer end of the spring so as to maintain the spring under compression, said detachable member and said spring lying wholly within the casing, so as to be inaccessible when the parts are in position.

7. A valve comprising a casing, a rotatable valve stem mounted therein, a seat engaging part movably connected with said stem, two engaging parts one on the casing and one on the stem underlying that on the casing, a shoulder on said casing above said two engaging parts, a spring surrounding the stem and engaging at its lower end with said shoulder, and a member detachably connected with said stem and engaging with the upper end of the spring to maintain it under compression, said spring and said member lying wholly within the casing so as to be inaccessible when the parts are in position.

In testimony whereof, I sign this specification in the presence of two witnesses.

EVERETT P. ALLEN.

Witnesses:
Geo. L. Wilkinson,
C. A. Mullen.